April 3, 1934. H. F. HORNE 1,953,111
LAMINATED MATERIAL AND METHOD OF PRODUCING SAME Filed June 16, 1930

INVENTOR
Harlan F. Horne
BY
ATTORNEY

Patented Apr. 3, 1934

1,953,111

UNITED STATES PATENT OFFICE 1,953,111

LAMINATED MATERIAL AND METHOD OF PRODUCING SAME

Harlan F. Horne, Wilkinsburg, Pa., assignor to Westinghouse Electric & Manufacturing Company, a corporation of Pennsylvania Application June 16, 1930, Serial No. 461,281

6 Claims. (Cl. 154—2)

My invention relates to laminated material and the process of producing same and more particularly to a laminated article having a colored surface.

The principal object of my invention is to provide a molded laminated material having a metallic or colored surface which is resistant to the action of light and mechanical abrasion.

Another object of my invention is to provide a laminated material having a colored surface upon which a suitable design of a different color may be applied.

A further object of my invention is to provide a method of producing laminated material having a colored surface which comprises passing fibrous sheet material through, or immersing it in, a suspension of a metallic powder or pigment, either before or after it has been impregnated with a suitable binder, or without impregnating it with a binder, interposing a plurality of layers of fibrous material impregnated with a binder between two such sheets and molding the assembled layers together under heat and pressure to form a composite article.

It has heretofore been the practice in forming laminated products having a colored surface sheet to pass the surface sheet through and coat it with a composition of matter comprising a pigment and a suitable binding agent, such as a solution of phenolic condensation product. The sheets were then dried to remove the solvent and a plurality of layers of fibrous material, impregnated with a binder were interposed between two of such sheets and the layers molded under heat and pressure to form the final article.

Laminated material produced by such a method however, is not entirely satisfactory because the surface sheets contain an excessive amount of varnish mixed with the pigment and when they are exposed to the light, discoloration of the pigment occurs which is probably caused by a catalytic action between the pigment and the binding agent.

I have made the discovery that a satisfactory laminated product may be produced by a process which comprises passing the fibrous material which is utilized as the surface layer through, or immersing it in, a suspension of a powdered metal or pigment either before or after it has been impregnated with a suitable binder or, if preferred, the surface layer may be passed through a suspension of the powder without being impregnated with a binder. A plurality of layers of fibrous material impregnated with a binder, may then be interposed between two of such surface layers and the assembled laminations molded under heat and pressure to form a composite article.

My invention will be better understood by reference to the accompanying drawing in which Fig. 1 is a perspective view of a composite plate of laminated material having an outer layer or film composed of a metal or pigment.

Figure 1:
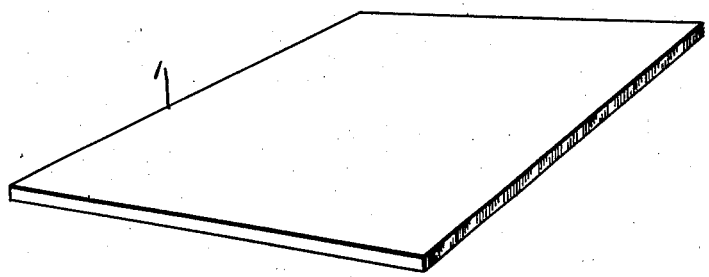
Figure 2:
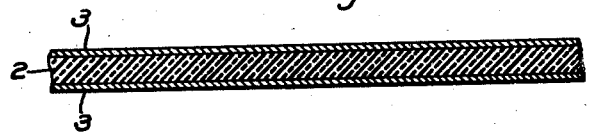
Fig. 2 is a cross-sectional view of a similar plate.

Referring to the drawing, the numeral 1 designates a laminated article having a body 2 formed of laminated sheet material and outer surface sheets or films 3, composed of metal or a suitable pigmentary substance. After the metal or pigmentary substance has been applied a decorative design 4, may be superimposed upon the surface of the sheet by a method to be hereinafter described.

In practicing my invention, I first form a suspension of a metallic powder, such as bronze, aluminum, or copper, or a pigment, which is stable at the molding temperature, such as ferric oxide, cadmium sulfide, ultramarine blue, chrome-oxide green, burnt umber, burnt sienna, lead chromate, carbon black, titanium oxide, zinc oxide or a mixture of two or more of such pigments and/or powders in a medium which is capable of being volatilized, such as ethyl alcohol, methyl alcohol, benzol, acetone, chloroform, water or a mixture of two or more of such media, by suitable means, such as by passing a mixture of the liquid and pigment or powder through a colloid mill, a ball mill, or the suspension may be effected by ordinary stirring. While the proportion of pigment in the suspension may be varied over wide proportion, I prefer to utilize from 500 to 2000 grams of the pigment to each gallon of liquid.

The surface sheets utilized in preparing the molded article are then passed through the suspension after they have been impregnated with a suitable agent such as shellac, a phenolic condensation product, a urea or thiourea-formaldehyde resin, or a mixture of the two, or satisfactory results may be obtained without impregnating the surface sheets with a binder. During the passage of the fibrous material, the suspension is agitated by suitable means, such as paddles, air agitation, a circulating pump or by stirring or agitating in any desired manner. A plurality of sheets of fibrous material are then interposed between two of such sheets and heat and pressure is applied to mold the laminated sheets into a composite article. Satisfactory results have been obtained by omitting the binder from the surface sheets as in practice it has been found that in utilizing certain types of fibrous sheets there will be sufficient binding agent present in the body sheets to firmly cement the surface sheets to the body of the article. I prefer, however, to first impregnate the sheet with a suitable binder before applying the powder or pigment.

It has also been found satisfactory to first pass the surface sheets through a suspension of the pigment, and then pass it through a solution of the binding agent. I prefer, however, to first impregnate the fibrous material with a suitable binding agent, which is capable of being hardened under heat and pressure, such as one of those previously mentioned, or a mixture of two or more of such binding agents, and then to pass it through or immerse it in the suspension of powders or pigments, to form the surface sheets.

The assembled treated paper is then placed between two metallic pressing plates and subjected to a pressure of approximately 600 pounds to 3000 pounds per square inch, and a steam pressure of 100 pounds to 150 pounds per square inch at a temperature of approximately 100° to 190° C. for a period of from 10 to 30 minutes. In practice, I have found it advisable in utilizing certain pigments, such as lead chromate, to maintain the steam pressure below 150 pounds per square inch because higher pressures have the tendency to cause discoloration.

The following specific example will serve to illustrate and explain my invention. A laminated article having an exceptionally brilliant, green surface was produced by the following process. 700 grams of green chromic oxide was thoroughly mixed in a ball mill for a period of three hours with one gallon of ethyl alcohol and the suspension was agitated by means of a stream of air. A sheet of white fiber paper, which had been previously treated with a phenolic condensation product, was passed through the suspension thus formed until it was thoroughly coated on both sides, after which it was dried at a temperature of 80° C. until the alcohol had entirely evaporated.

The treated paper was then placed upon opposite sides of a plurality of layers of paper, impregnated with a phenolic condensation product, and the assembled layers were placed between two metallic plates in a molding machine and subjected to a mechanical pressure of 1000# per square inch and to a steam pressure of 125# per square inch for a period of thirty minutes at a temperature of 165° C. The material was permitted to cool, the pressure being maintained during the cooling process, and the finished article was then removed.

The time required for the pressing operation is partially regulated by the thickness of the material being pressed. Other variations of the pressing time and temperature employed will depend upon the nature of the particular pigment or powder and upon the binding agent which is utilized. While any suitable liquid medium may be employed for suspending the pigment, I prefer to employ a liquid or mixture of liquids, one at least of which will slightly soften the resin content of the treated paper so as to allow the pigment or metallic powder to be retained on it.

Following the method described in my invention, a laminated material may be produced which is uniformly covered with a pigment or a metallic powder or a mixture thereof, and as the surface of the product may be given any desired color, artistic effects may be produced.

Figure 3:
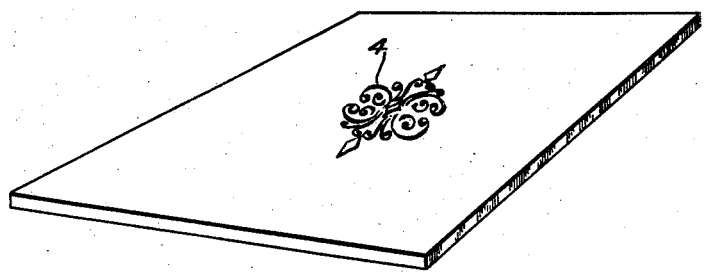
Fig. 3 is a perspective view of a laminated article similar to Fig. 1, having a design superimposed thereon formed of a different colored powder or pigment.

The design disclosed in Fig. 3 may be produced by applying a suspension of the pigment or powder to the surface of a sheet of untreated fibrous material, or a sheet of fibrous material which has previously been treated or impregnated with a suitable binder, through an appropriate stencil, or the suspension may be first applied to the fibrous material through an appropriate stencil and the fibrous material then impregnated with the binder. In providing highly ornamental articles, however, I prefer to provide the sheets with a complete coating of the pigment in the manner previously specified and to then superimpose a design of a different color upon the surface sheet by applying a suspension of a pigment having a different color, upon the previously colored sheet, through a stencil having openings designed to produce the desired configuration.

Laminated material produced by my process is not appreciably affected by the action of light or air and the finished plates have a more brilliant color than that produced by prior methods. The material has excellent resistance to water and mechanical abrasion and since any desired color, or combination of colors, may be produced, very pleasing effects may be obtained.

While I have described my invention in considerable detail and have given specific examples, it will be understood that the examples should be construed as illustrative and not by way of limitation. For example the colored film may be applied to only one surface of the laminated material, in which event the material may be employed as the facing sheet described and shown in the copending application of William E. Gwaltney, Serial No. 449,042, filed on May 1, 1930, which is assigned to the Westinghouse Electric and Manufacturing Company.

Other modifications will be apparent to those skilled in the art without departing from the spirit and scope of my invention, and it is desired that only such limitations shall be imposed as are indicated in the appended claims.

I claim as my invention:

1. A process of producing an article of heat-hardening resinous base with a pigmented surface, comprising applying to the surface, containing resin capable of being hardened by heat, a mixture consisting substantially of resin-softening agent that is volatile and pigment.

2. A process of producing an article of heat-hardening resinous base with a pigmented surface, comprising treating surface material of fibrous nature, containing resin capable of being hardened by heat, with a mixture consisting substantially of alcohol and pigment.

3. A process of producing an article of heat-hardening resinous base with a pigmented surface, comprising impregnating a fibrous sheet with resin capable of hardening with heat, softening a surface of the sheet with volatile agent, applying pigment to the surface while soft, drying and then molding the pigmented sheet with the resinous base.

4. A process of producing an article of heat-hardening resinous base with a pigmented surface, comprising impregnating a fibrous sheet with resin capable of hardening with heat, drying the sheet, coating with a mixture consisting substantially of volatile, resin-softening agent and pigment, drying and then molding the pigmented sheet with the resinous base.

5. A process of producing an article of heat-hardening resinous base with a pigmented surface, comprising impregnating a fibrous sheet with resin capable of being hardened with heat, coating with a mixture consisting substantially of alcohol and pigment, drying and then molding the pigmented sheet with the resinous base.

6. A process of producing an article of heat-hardening resinous base with a pigmented surface, comprising impregnating a fibrous sheet with phenolic resin, coating the sheet containing the resin in condition for hardening by heat with a mixture substantially of alcohol and metal powder, drying and then molding the pigmented sheet with the resinous base.

HARLAN F. HORNE.